United States Patent [19]
Zhou et al.

[11] Patent Number: 5,878,133
[45] Date of Patent: Mar. 2, 1999

[54] DIGITAL DIRECT CURRENT FEED CONTROL FOR A COMMUNICATION SYSTEM

[75] Inventors: Yan Zhou; Walter S. Schopfer, both of Austin, Tex.

[73] Assignee: Advanced Micro Devices, Inc., Sunnyvale, Calif.

[21] Appl. No.: 699,049

[22] Filed: Aug. 21, 1996

[51] Int. Cl.$^6$ ................................................. H04M 9/00
[52] U.S. Cl. ........................ 379/413; 379/324; 379/398; 379/399; 323/283
[58] Field of Search .................................. 379/413, 399, 379/377, 350, 338, 339, 322, 242, 324, 394, 398, 124; 322/17, 25; 323/283; 363/21; 455/343; 370/311, 337

[56] References Cited

U.S. PATENT DOCUMENTS

| | | | |
|---|---|---|---|
| 5,172,407 | 12/1992 | Alenius | 379/130 |
| 5,329,588 | 7/1994 | Willocx et al. | 379/413 |
| 5,452,345 | 9/1995 | Zhou et al. | 379/124 |

FOREIGN PATENT DOCUMENTS

| | | |
|---|---|---|
| 0446944A2 | 3/1991 | European Pat. Off. . |
| 0663755A1 | 12/1994 | European Pat. Off. . |
| 57-194124 | 11/1982 | Japan . |
| 94/10809 | 5/1994 | WIPO . |

*Primary Examiner*—Krista Zele
*Assistant Examiner*—Jacques M. Saint-Surin
*Attorney, Agent, or Firm*—Foley & Lardner

[57] ABSTRACT

A communication system includes a SLIC device and a SLAC device. The SLIC device and the SLAC device cooperate to control the power level provided to a subscriber line. The SLAC device includes a digital control circuit which receives a parameter signal indicative of a first parameter of the electrical power. The digital control circuit provides a digital control signal to the SLIC device in response to a sample digital control signal and the digital parameter signal. Preferably, the digital parameter signal relates to a sensed current signal and the sample digital control signal relates to a desired voltage signal. The digital control circuit can be implemented hardware or software.

21 Claims, 3 Drawing Sheets

DIGITAL DIRECT CURRENT FEED CONTROL FOR A COMMUNICATION SYSTEM

FIELD OF THE INVENTION

The present invention relates to a control circuit for regulating a power source. More particularly, the present invention relates to a power supply control circuit or battery feed control circuit for use in a telecommunication system.

BACKGROUND OF THE INVENTION

Throughout the world, telephone systems and communication systems rely on a battery feed circuit or power supply to provide electrical power to a subscriber line or load. The level of power supplied to the subscriber line must be controlled according to regional specifications such as Bellcore, CCITT, and EIA to ensure proper operation of the telecommunication equipment attached to the subscriber line. The power supply or battery feed circuit generally provides direct current (DC) power within an acceptable range of voltage and current levels to the subscriber line. The battery feed circuit should ideally provide an appropriate amount of power for both long subscriber lines or loops and short subscriber lines or loops. For example, more power is required for the higher impedance loops such as long loops than for the lower impedance loops such as short loops.

Most telephone or communication systems include a central office (office exchange) which generally includes a line card having a subscriber line interface circuit (SLIC device) and a subscriber line audio-processing circuit (such as a SLAC™ or DSLAC™ device manufactured by Advanced Micro Devices). The SLIC device is an analog interface coupled to the subscriber line; the SLIC device generally includes audio amplifiers and often supports line card "BORSHT" (battery feed, over-voltage protection, ringing signal, supervision of the line, hybrid two to four-wire conversion, and test) functions. The SLIC device often is coupled to SLAC device on the line card. The subscriber line is generally coupled to a subscriber telephone, termination equipment or other customer communications equipment.

The SLAC device which is generally coupled to the SLIC device transmits and receives analog signals from the SLIC device and provides digital signals to the central office. The SLAC device generally includes analog-to-digital (A/D) converters and digital-to-analog (D/A) converters. The SLAC device typically handles filtering and conversion tasks necessary to interface the analog signals from the SLIC device to the digital pulse code modulation (PCM) highway associated with the central office.

Generally, the SLIC device or other equipment in the central office includes a battery feed circuit or DC power supply which provides power to the subscriber line. Alternatively, the battery feed circuit can be an external component. The battery feed circuit often includes an analog regulator or other analog control circuit which provides an appropriate current level or voltage level to the subscriber line in accordance with the regional specifications. The battery feed circuit requires the analog regulator to provide the appropriate output current level or voltage level over the variable impedance of the subscriber liner. The impedance of the subscriber line can vary from less than 200 ohms to more than 3.1 k ohms. The variance in impedance is generally due to the variable subscriber line lengths from the central office to the customer telephone or other equipment.

Analog regulation circuits are disadvantageous because they consume a relatively large amount of power, generate relatively significant amounts heat, occupy space on the integrated circuit substrate and on the line card, and are subject to long-term instability and imprecision. Such disadvantages can be accentuated by the large impedance variation associated with the subscriber line in a telephone system. Thus, there is a need for a battery feed control circuit which is inexpensive, occupies a minimal amount of chip space, and is precise and stable.

SUMMARY OF THE INVENTION

The present invention relates to a power supply control circuit and includes a first parameter input operatively coupled to the communication system, a second parameter output operatively coupled to the communication system, a sampling circuit coupled to the second parameter output, and a digital control circuit coupled to the first parameter input, the second parameter output and the sampling circuit. The first parameter input receives a first parameter associated with the electrical power, and the second parameter output provides a second parameter associated with the electrical power. The sampling circuit samples the second parameter associated with the electrical power at the second parameter output. The digital control circuit provides the second parameter associated with the electrical power at the second parameter output in response to the second parameter received from the sampling circuit and the first parameter received at the first parameter input.

The present invention also relates to a method of controlling the electrical power supplied to a communication system with a control circuit. The electrical power has a first parameter and a second parameter. The control circuit provides a digital control signal indicative of the second parameter at an output. The method includes steps of sampling the digital control signal indicative of the second parameter and storing a sampled digital control signal, receiving a digital parameter signal indicative of the first parameter of the electrical power, and providing the digital control signal at the output in response to the sampled digital control signal and the digital parameter signal.

The present invention further relates to a power supply control circuit for providing electrical power to a telecommunication system. The power supply control circuit includes a first parameter input means for receiving a first parameter associated with the electrical power, a second parameter output means for providing a second parameter associated with the electrical power to the communication systems, a sampling means for sampling the second parameter associated with the electrical power at the second parameter output, and a digital control means for controlling the second parameter associated with the electrical power at the second parameter output. The digital control means provides the second parameter in response to the second parameter received from the sampling circuit and the first parameter received at the first parameter input.

The present invention even further relates to a SLAC device integrated on a single substrate. The SLAC device controls electrical power provided to a communication system. The SLAC device controls electrical power provided to a communication system by providing a second parameter signal to a power supply circuit. The SLAC device includes a digital control circuit having a first parameter input, a second parameter output, and a sampling circuit. The digital control circuit provides the second parameter signal associated with the electrical power at the second parameter output in response to the second parameter received from the sampling circuit and a first parameter received from the first parameter input.

In one aspect of the present invention, an advantageous battery feed control circuit is a low cost digital control circuit integrated on a single semiconductor substrate of a SLAC device. The digital control circuit precisely controls the power level to the subscriber line by setting a parameter of the electrical power such as voltage or current for the power supply or battery feed circuit. The digital control circuit determines the appropriate level for the parameter in response to a voltage parameter and current parameter associated with the electrical power. The digital control circuit is advantageously manufactured from low cost parts, consumes minimal power, and yet precisely controls the power level provided to the subscriber line.

In another aspect of the present invention, the digital control circuit digitally samples the current or voltage being provided to the subscriber line and sets the appropriate current or voltage to be provided to the subscriber line according to a digital control algorithm. Preferably, the digital control algorithm is a hardware control scheme which utilizes a previously sampled voltage or current control value and a present sensed value of the current or voltage. The digital control algorithm generates a digital control signal which is converted and provided to a power operational amplifier or other analog devices which controls the level of electrical power provided to the subscribe line in accordance with the control signal. The power operational amplifier is integrated with a SLIC device.

Further objects and features of the present invention will be apparent from the following specification claims when considered in connection with the accompanying drawings illustrating the preferred exemplary embodiments of the present invention.

BRIEF DESCRIPTION OF THE DRAWINGS

The invention will hereafter be described with reference to the accompanying drawings, wherein like reference numerals denote like elements in the various drawings, and.

DETAILED DESCRIPTION OF THE PREFERRED EXEMPLARY EMBODIMENT

Figure 1:
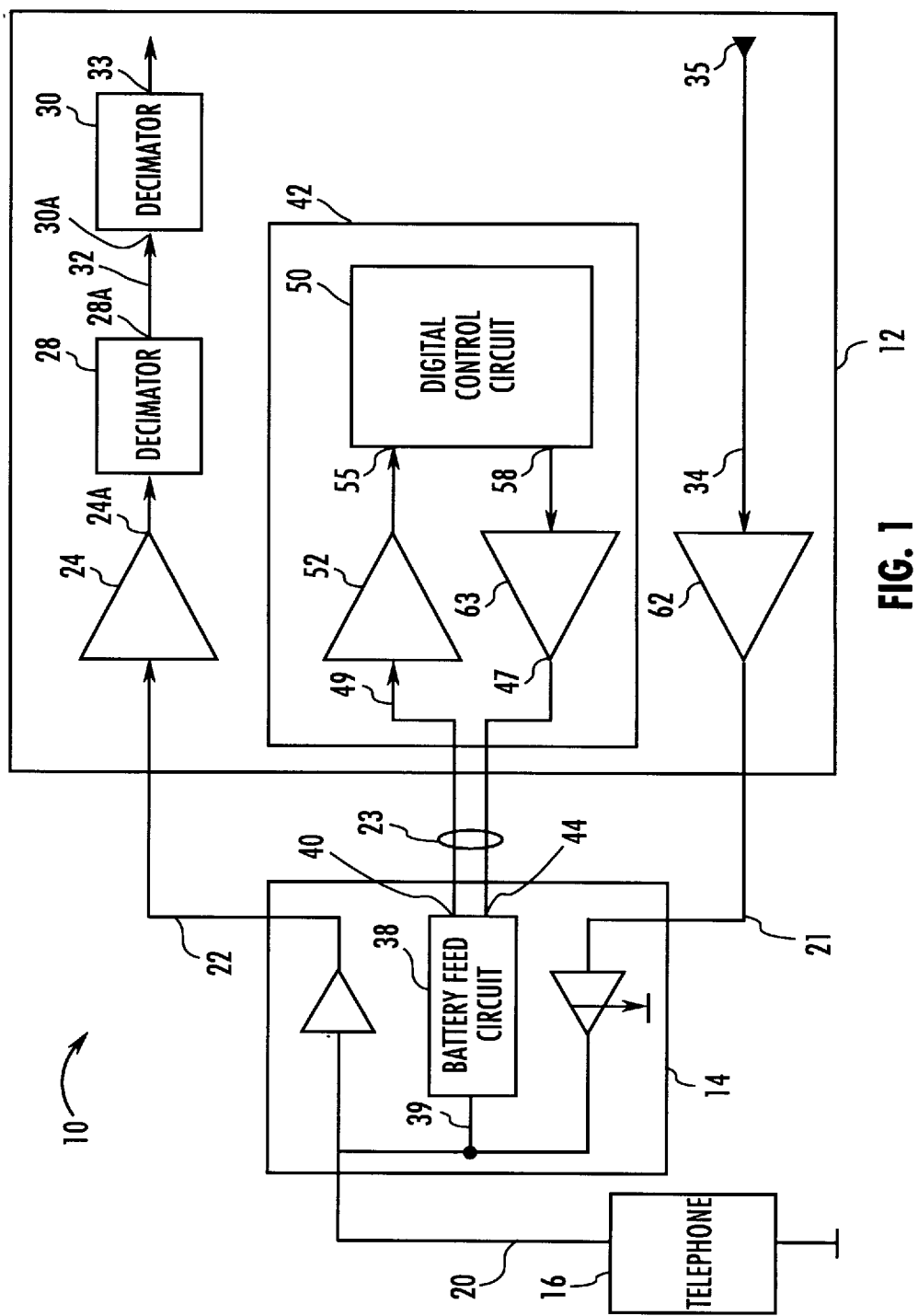
FIG. 1 is a schematic block diagram of a communication system including an exemplary preferred embodiment of the present invention.

FIG. 1 is a schematic block diagram of a communication system 10 including an exemplary embodiment of the present invention. In FIG. 1, communication system 10 is preferably a telephone communication system including a SLAC device 12, a SLIC device 14, and termination equipment such as a telephone 16. SLIC device 14 is coupled to telephone 16 via a subscriber line 20.

SLIC device 14 is coupled to SLAC device 12 via an analog receive path 21, an analog transmit path 22, and a battery feed circuit interface 23. A DC power or battery feed circuit 38 is operatively coupled through an output 39 to subscriber line 20. Battery feed circuit 38 provides electrical power comprised of a first parameter such as current and a second parameter such as voltage to subscriber line 20. Battery feed circuit 38 preferably can provide a controlled voltage level output or a controlled current level output for subscriber line 20 in accordance with regional standards such as those shown in FIG. 2. The electrical power provided by battery feed circuit 38 is generally controlled so the voltage parameter and the current parameter fall within Bellcore, CCITT, EIA or other telecommunication standards.

Preferably, battery feed circuit 38 is a controlled voltage source or voltage feed circuit for subscriber line 20. Alternatively, battery feed circuit 38 can provide a controlled current source or current feed circuit for subscriber line 20. Battery feed circuit 38 includes a first parameter output or current sense output 40 and a second parameter input or voltage level control input 44 as part of interface 23.

Battery feed circuit 38 provides electrical power at an appropriate level to line 20 in accordance with the second parameter control signal or voltage level control signal received from SLAC device 12 at input 44. The voltage level control signal is preferably an analog signal indicative of the voltage level at which circuit 38 should provide power to line 20. In an alternative, circuit 38 can be configured to provide a particular current level to line 20 in response to a current level control signal received from SLAC device 12 at input 44.

Battery feed circuit 38 senses the first parameter or current level of the electrical power on subscriber line 20 and provides a current sense signal at output 40. Alternatively, circuit 38 could sense the second parameter or voltage level of the power on line 20. The current sense signal is an analog signal. SLIC device 14 or the line (and not shown) in system 10 can include a current sensing circuit, current meter or other device for generating the current sense signal. For example, SLIC device 12 can include two resistors each (not shown) coupled in series with both leads (not shown) associated with line 20. The two resistors provide voltage signals to an operational amplifier circuit which generates the sense signal. Alternatively, other circuit elements for determining the current sense signal such as A/D converters, operational amplifiers, or other sense elements could be utilized.

SLAC device 12 (FIG. 1) preferably includes a digital power source control circuit or battery feed control circuit 42, an A/D converter 24, a first decimeter 28, a second decimeter 30, and a D/A converter 62. SLAC device 12 is preferably a programmable SLAC device with impedance matching and echo suppression.

A/D converter 24 is coupled to analog transmit path 22. First decimeter 28 is coupled to an output 24A of A/D converter 24. An output 28A of first decimeter 28 is coupled to a digital transmit path 32. Digital transmit path 32 is coupled to an input 30A of second decimeter 30. Second decimeter 30 provides a transmit path output 33 for other devices associated with SLAC device 12. Digital receive path 34 in SLAC device 12 includes a digital receive path input 35 which is coupled to other components associated with SLAC device 12. A D/A converter 62 provides signals from path 35 as analog signals on analog receive path 21 to SLIC device 14.

A control signal output 47 of battery feed control circuit 42 is coupled to control input 44 of circuit 38. Sense output 40 of SLIC device 14 is coupled to a sense input 49 of circuit 42 in SLAC device 12. Circuit 42 includes an A/D converter 52, a D/A converter 54 and a digital control circuit 50. Digital control circuit 50 includes a digital parameter input or current level input 55 and a digital parameter output or voltage level control output 58. Input 55 is coupled to the output of A/D converter 52, and output 58 is coupled to the input of D/A converter 63.

With reference to FIG. 1, the operation of communication system 10 including battery feed control circuit 42 is as follows. Circuit 42 is preferably integrated with SLAC device 12 to advantageously reduce costs associated with the line card (not shown) in which the present invention would be advantageously employed. Circuit 42 provides control of the amplitude or level of the power provided to line 20 of communication system 10 with minimal chip real estate or circuitry added to SLAC device 12 or SLIC device 14. Circuit 42 cooperates with analog circuitry in SLIC device 14 to advantageously control the power to line 20 with minimal additional circuitry.

Battery feed control circuit 42 preferably provides a feedback signal or voltage level control signal to battery feed circuit 38 to control the level of electrical power on subscriber line 20. Telephone 16 (or other communication equipment) receives and transmits electrical signals representative of audio sounds or other data on subscriber line 20. SLIC device 14 preferably supports various line card functions such as battery feed, over-voltage protection, ringing signal, supervision of the line, hybrid two-wire to four-wire conversion, and test ("BORSHT") functions for interfacing telephone 16 to analog receive path 21, and analog transmit path 22. SLIC device 14 provides analog electrical signals at analog transmit path 22 to SLAC device 12, and receives analog signals from SLAC device 12 at analog receive path 21.

SLAC device 12 receives analog signals on analog transmit path 22. A/D converter 24 converts the analog signals on analog transmit path 22 to digital transmitted signals. The digital transmitted signals are decimated by first decimeter 28 and provided to digital transmit path 32. Digital transmit path 32 generally refers to the entire medium for communicating the digital transmitted signals in SLAC device 12. A communication path or transmit path generally refers to any portion or portions of the entire medium, digital or analog, for communicating signals between telephone 16 and the central office (not shown).

The digital transmitted signals on digital transmit path 32 are further decimated by second decimeter 30. Second decimeter 30 provides the digital transmitted signals on transmit path 32 to digital transmit path output 33 which provides the digital transmitted signals to the central office (not shown) or other circuitry in SLAC device 12.

SLAC device 12 receives digital received signals from other equipment coupled to SLAC device 12, or other internal components in SLAC device 12 at receive path input 35. Converter 62 provides digital signals on SLAC device digital receive path 34 as analog received signals to analog receive path 21.

Figure 2:
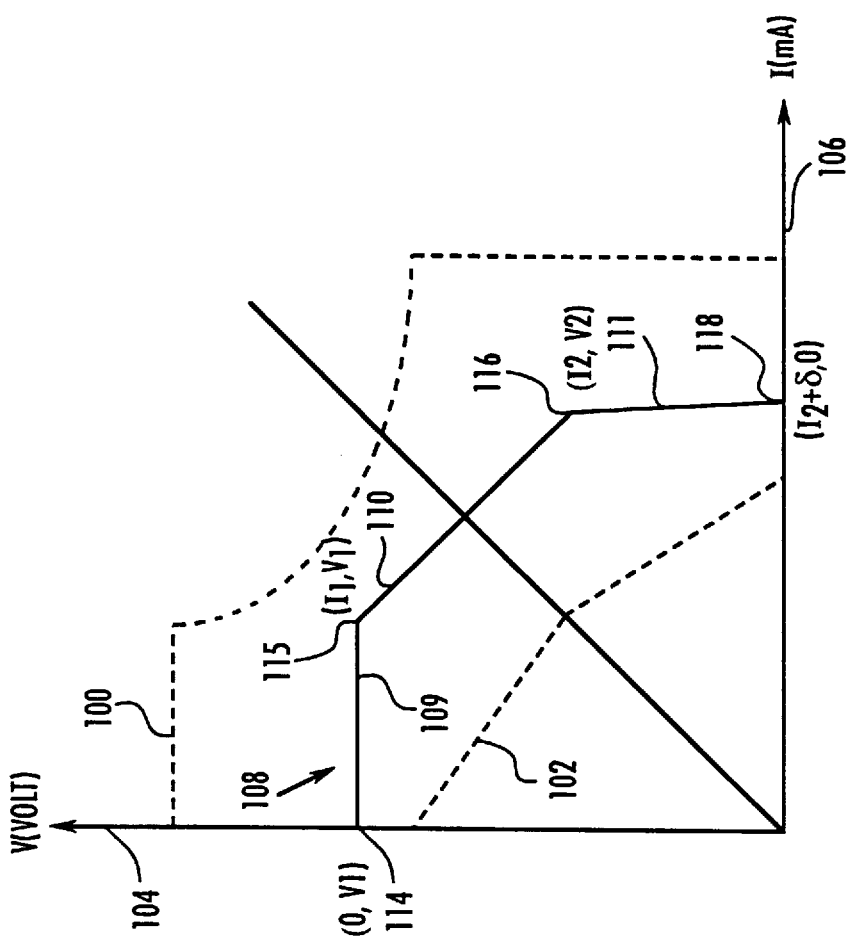
FIG. 2 is a diagram showing the voltage and current characteristics for the subscriber line in the communication system illustrated in FIG. 1.

With reference to FIGS. 1 and 2, the operation of battery feed control circuit 42 and digital control circuit 50 in system 10 is described below. FIG. 2 represents a power control curve in accordance with a preferred exemplary embodiment of the present invention. In accordance with an exemplary regional standard, battery feed circuit 38 should provide power in accordance with the parameters shown in FIG. 2. A dashed line 100 provides the upper limits for the electrical power, and a dashed line 102 provides the lower limits for the electrical power provided to subscriber line 20. A Y axis 104 represents voltage, and an X axis 106 represents current.

Battery feed control circuit 42 and battery feed circuit 38 cooperate to ensure that the electrical power is provided in accordance with a three-piece linear curve 108. Alternatively, curve 108 may be comprised of one or more arcuate segments which are disposed between lines 100 and 102. Curve 108 is comprised of a horizontal segment 109, a diagonal segment 110 and a nearly vertical segment 111. Segment 109 is bounded by a point 114 at coordinates (0,V1) and a point 115 at coordinates (I1, V1). Segment 110 is bounded by point 115 and a point 116 at coordinates (I2, V2). Segment 111 is bounded by point 116 and a point 118 having coordinates (I2 plus delta, 0).

Battery feed circuit 38 provides power at output 39 to subscriber line 20 so that the current and voltage parameters lie on curve 108, thereby ensuring that the electrical power is provided within the upper and lower limits (e.g., lines 100 and line 102). In the preferred embodiment, battery feed circuit 38 includes a power operational amplifier which controls the amount of voltage provided to subscriber line 20 in response to the voltage level control signal provided to input 44 of battery feed control circuit 38. The voltage level control signal is derived from a digital voltage level control signal calculated by digital control circuit 50 in response to a previous digital voltage level control signal and a digital current sense signal.

Digital control circuit 50 receives a digital value from A/D converter 52 at input 55 indicative of the current associated with subscriber line 20 and generates the digital voltage control signal at output 58 indicative of appropriate voltage which is to be provided at output 39 of circuit 38 in accordance with curve 108. Alternatively, digital control circuit 50 and battery feed circuit 38 can be configured in a current feed implementation where digital control circuit 50 receives a voltage level sense signal associated with subscriber line 20 and provides a current control level signal which controls the amount of current provided by battery feed circuit 38. The particular implementation utilizing a sensed current and controlling the voltage to obtain a response of curve 108 is shown and described only in an exemplary fashion. The claims are not limited to a voltage feed implementation.

Figure 3:
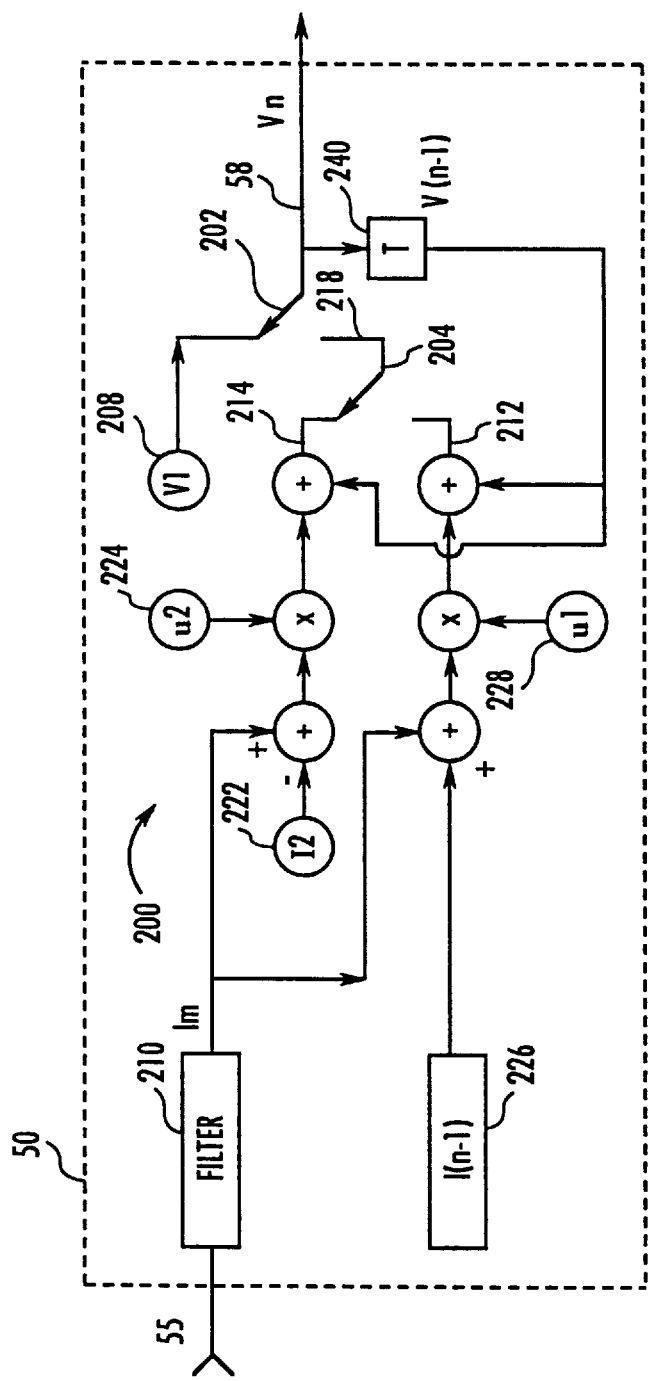
FIG. 3 is a control diagram showing an implementation of an exemplary embodiment of the present invention illustrated in FIG. 1.

With reference to FIG. 3, a voltage feed control diagram 200 for digital control circuit 50 is shown which provides an exemplary technique for calculating the digital voltage level control signal. Preferably, diagram 200 is implemented in hardware within SLAC device 12. Alternatively, diagram 200 can be implemented in software operated by a microcontroller, or other processors associated with the line card (not shown) or SLAC device 12.

Digital control circuit 50 performs operations in accordance with control diagram 200 to generate the digital voltage level control signal (e.g., $V_n$) at output 58 of digital control circuit 50. The digital voltage level control signal $V_n$ is provided through D/A converter 63 to battery feed circuit 38 as the analog voltage level control signal. Battery feed circuit 38 includes a power operational amplifier which controls the voltage on subscriber line 20 in accordance with the analog voltage level control signal.

Digital control circuit 50 in accordance with control diagram 200 generates the digital voltage level control signal $V_n$ in accordance with curve 108 (FIG. 2). Digital control circuit 50 calculates the digital voltage level control signal in response to a previous digital voltage level control signal (e.g., $V_{n-1}$) and the digital current level sense signal (e.g., $I_m$) received at input 55 of circuit 50. The digital current level sense signal $I_m$ is provided by D/A converter 52 and is related to the analog current sense signal from circuit 38.

In accordance with curve 108, control diagram 200 and digital control circuit 50 set the value of the digital voltage level control signal $V_n$ to the constant $V_1$ when the current sense signal $I_m$ is less than a constant current value $I_1$. As shown by segment 109 of curve 108, the voltage provided to subscriber line 20 should be set equal to $V_1$ when the current is less than I2. Thus, the digital voltage control signal $V_n$ is defined as follows:

$$V_n = V_1 \text{ when } I_m \text{ is less than } I_1 \quad (1)$$

$V_1$ is constant which can be user selected in accordance with curve 108.

When the current sense signal $I_m$ is less than a constant current value I2 and greater than the constant current value I1, digital control circuit 50 calculates the digital voltage level control signal Vn in accordance with segment 109 as follows:

$Vn = V_{n-1} + K1(I_n - I_{n-1})$ where: K1 is a constant equal to $(V1-V2)/(I1-I2)$;

$V_{n-1}$ is equal to a previous value of the digital voltage level control signal;

$I_m$ is equal to the current level sense signal; and $I_{n-1} = I1 + (V_{n-1}) - V1/K1$.

In a more simplified form, the digital voltage level control signal $U_n$ is defined as:

$$V_n = V_{n-1} + \mu 1 (I_m - I_{n-1}) \quad (2)$$

The constant $\mu 1$ is a value representing adaptive step size and is preferably proportional to K1. The constant $\mu 1$ can be chosen to be equal to K1.

The previous digital voltage level control signal $V_{n-1}$ is preferably derived by use of a sampling circuit such as a sampling circuit 240 (FIG. 3). Sampling circuit 240 includes a register such as a 1 bit serial shift register or other storage element. Sampling circuit 240 preferably stores the value of Vn for a delay period of one cycle (e.g., 250 Hz), such as 0.004 seconds. Therefore, sampling 240 can provide the value $V_{n-1}$ for the listed equations above.

The value $I_m$ is preferably filtered by a filter 210. Filter 210 is preferably a digital low pass coupled to input 55 and helps to reduce audio signal distortions and power supply noise associated from subscriber line 20, thereby increasing the precision of the measurement of current on subscriber line 20. Filter 210 has a frequency threshold of 1 Hz to avoid audio signal distortions. The constant current values I1 and I2 are preferably user selectable in accordance with curve 108 current values I1 and I2 as well as voltage values V1 and V2 and constants K1 and $\mu 1$ may be permanently stored in SLAC device 12 or temporarily programmed in storage elements such as registers, PROMS or EPROMS.

When the digital current sense signal Im is greater than or equal to I2, digital control circuit 50 calculates the digital voltage level control signal Vn in accordance with segment 111. Control circuit 50 in accordance with control diagram 200 calculates the digital voltage level control signal Vn as follows:

$Vn = V_{n-1} + K2(I_m - I_{n-1})$. In this equation, the value of $I_{n-1}$ is set to I2 due to the nature of segment 111. In a more simplified form, digital control circuit 50 defines the digital voltage level control signal Vn as:

$$Vn = V_{n-1} + \mu 2 (I_m - I2) \quad (3)$$

The constant $\mu 2$ is a different adaptation coefficient. The constant $\mu 2$ is preferably representative of the coefficient K2 (where K2 equals $-V2/\delta$). As $\delta$ approaches 0, K2 becomes a very large number. Therefore, $\mu 2$ is typically selected to be very small (such as 0.005) to prevent instability in the performance control diagram 200.

Control diagram 200 demonstrates the calculation of the equations discussed above. Switches 202 and 204 cooperate to select the appropriate digital voltage level control signal $V_n$ to be provided at output 58. As shown in FIG. 3, switch 202 is shown in a position when $I_m$ is less than I1 in accordance with segment 109. Switch 204 is shown in position when Vn-1 is less than V2 or when Im is between I1 and I2.

When the digital current sense signal $I_m$ is less than I1, switch 202 provides a constant value V1 which is stored in a register or memory storage element 208. Switch 202 provides the constant V1 to output 58 as the digital voltage level control signal $V_n$. Register 208 may be programmed by software, preprogrammed within the factory, or otherwise configured to provide an appropriate value such as constant V1 when the current sense signal In is below I1.

When the digital current sense signal Im is above I1, switch 202 connects to a branch 218. If the current sense signal $I_m$ is below I2 or the previous digital voltage level control signal $V_{n-1}$ is below V2, switch 204 is coupled to branch 214. Branch 214 produces the digital voltage level control signal in accordance with Equation 3. The constant values I2 and $\mu 2$ utilized in Equation 3 are stored in registers 222 and 224 respectively. Alternatively, registers 222 and 224 may be hard wired, software controlled, or otherwise provided within circuit 50.

If the previous voltage level control signal $V_{n-1}$ is below V2 or the current sense signal In is greater than or equal to I2, switch 202 is coupled to branch 218 and switch 204 is coupled to branch 212. Branch 212 calculates the digital voltage level control signal $V_n$ in accordance with Equation 2. Digital control circuit 50 calculates the value $I_{n-1}$ in a circuit 226 within branch 212 to appropriately calculate the digital voltage level control signal $V_n$. The constant $\mu 1$ is preferably stored in a register or storage element 228.

Digital control circuit 50 preferably stops the adaptation search for the digital voltage level control signal $V_n$ if the absolute value of $V_n - V_{n-1}$ is less than an error limit constant such as E1. The constant E1 is preferably equal to 1V. Preferably, circuit 50 resumes the adaptation search when the absolute value of $V_n - V_{n-1}$ is greater than an error limit constant E2, where E1 is much less than E2. The E2 constant is preferably equal to 2V. Stopping the adaptation search prevents loop noise from directly feeding to the digital voltage level control signal $V_n$ and thereby reduces feed noise dramatically. Thus, the digital voltage level control signal $V_n$ is maintained at the same value when the difference $V_n$ and $V_{\nu-1}$ is less than the constant E1 until the difference becomes greater than the constant E2. The use of constants E1 and E2 provides advantageous hysterisis for circuit 50.

As stated above, control diagram 200 and digital control circuit 50 can be implemented as a current feed implementation wherein circuit 50 receives a voltage sense input at input 55 and provides a current control output at output 55. Digital control circuit 50 implementation would still control the power provided to subscriber line 20 in accordance with dashed lines 100 and 102. However, battery feed circuit would receive a current level control signal and control the current provided to subscriber loop 20 in accordance with the current level control signal. Additionally, battery feed circuit 38 would include a voltage measuring device or other apparatus to provide a voltage level signal to SLAC device 12. The voltage measuring circuit could be an operational amplifier circuit coupled to a voltage divider coupled to the leads (not shown) associated with line 20. Equations similar to Equations 1–3 discussed above can be derived for a current level feed in accordance with the teachings of the present invention.

It is to be understood that, while the detailed drawings and specific examples given describe a preferred exemplary embodiment of the present invention, they are for the purpose of illustration only. The apparatus of the invention is not limited to the precise details and conditions disclosed. Single lines in the drawings may represent multiple conductors. For example, although the apparatus is shown as integrated on a SLAC device in a communication system including a SLIC device, the apparatus may be employed integrated with other devices or separately. Also, the apparatus may be employed in other communication systems. Various changes may be made to the details disclosed without departing from the spirit of the invention which is defined by the following claims.

We claim:

1. In a communication system, a power supply control circuit for controlling electrical power to the communication system, the power control circuit comprising:

a first parameter input operatively coupled to the communication system, the first parameter input receiving a first parameter sense signal associated with a first parameter of the electrical power;

a second parameter output operatively coupled to the communication system, the second parameter output providing a second parameter control signal associated with a second parameter of the electrical power;

a sampling circuit coupled to the second parameter output, the sampling circuit sampling the second parameter control signal associated with the electrical power at the second parameter output and storing a sampled second parameter;

a digital control circuit coupled to the first parameter input, the second parameter output and the sampling circuit, the digital control circuit providing the second parameter control signal at the second parameter output in response to the sampled second parameter control signal received from the sampling circuit and the first parameter sense signal received at the first parameter input.

2. The power supply control system of claim 1 wherein the first parameter is current and the second parameter is voltage.

3. The power supply of claim 1 wherein the first parameter is voltage and the second parameter is current.

4. The power supply of claim 3 wherein the communication system includes a SLIC device and a SLAC device and the digital control system is integrated on the SLAC device.

5. The power supply 4 wherein the sampling circuit includes a register and the sampled second parameter control signal is stored in the register for a delay period.

6. In a communication system receiving electrical power, a method of controlling the electrical power supplied to the communication system with a control circuit, the electrical power having a first parameter and a second parameter, the control circuit providing a digital control signal indicative of the second parameter at an output, the method comprising steps of:

sampling the digital control signal indicative of the second parameter and storing a sampled digital control signal;

receiving a digital parameter signal indicative of the first parameter of the electrical power; and providing the digital control signal at the output in response to the sampled digital control signal and the digital parameter signal.

7. The method of claim 6 wherein the first parameter is current and the second parameter is voltage.

8. The method of claim 7 wherein the first parameter is voltage and the second parameter is current.

9. The method of claim 6 wherein the sampled digital control signal is stored in a register.

10. In a telecommunication system, a power supply control circuit for providing electrical power to the telecommunication system, the power supply control circuit comprising:

a first parameter input means for receiving a first parameter sense signal associated with a first parameter of the electrical power;

second parameter output means for providing a second parameter control signal associated with a second parameter of the electrical power to the communication system;

a sampling means for sampling the second parameter control signal associated with the electrical power; and a digital control means for providing the second parameter control signal in response to the second parameter control signal received from the sampling circuit and the first parameter sense signal received at the first parameter input.

11. The power supply control circuit of claim 10 wherein the first parameter is current and the second parameter is voltage.

12. The power supply control circuit of claim 10 wherein the first parameter is voltage and the second parameter is current.

13. The power supply control circuit of claim 10 wherein the communication system includes a SLIC device and a SLAC device, and the power supply control circuit is integrated on the SLAC device.

14. The power supply control circuit of claim 10 wherein the sampling means includes a register, the register storing the second parameter control signal for a delay.

15. The power supply control circuit of claim 10 wherein the second parameter control signal is generated in accordance with a three-piece wise linear curve.

16. The power supply control circuit of claim 15 wherein the three-piece wise linear curve is comprised of a substantially vertical section, a substantially horizontal section, and a third section.

17. A subscriber line control device integrated on a single substrate, the device for controlling electrical power provided to a communication system by providing a second parameter control signal to a power supply circuit, the device comprising:

a digital control circuit having a first parameter input, the digital control circuit providing the second parameter control signal associated with a second parameter of the electrical power in response to a first parameter sense signal received from the first parameter input and a prior value of the second parameter control signal, the first parameter sense signal being associated with a first parameter of the electrical power.

18. The device of claim 17 wherein the device includes a D/A converter coupled to the second parameter output and an A/D converter coupled to the first parameter input.

19. The device of claim 18 wherein the first parameter is current and the second parameter is voltage.

20. The device of claim 18 wherein the first parameter is voltage and the second parameter is current.

21. In a telecommunication system, a power supply control circuit for providing electrical power to the communication system, the power supply control circuit comprising:

an input means for receiving a first parameter sense signal associated with a first parameter of the electrical power;

an output means for providing a second parameter control signal associated with a second parameter of the electrical power;

a sampling means for sampling the second parameter control signal; and a digital control means for providing the second parameter control signal in response to the second parameter control signal received from the sampling circuit and the first parameter sense signal received at the first parameter input, wherein the second parameter control signal is generated in accordance with a three-piece wise linear curve.

* * * * *